(No Model.)
J. P. DUNCAN & E. D. PILLOW.
POISON DISTRIBUTER.
No. 321,011. Patented June 30, 1885.
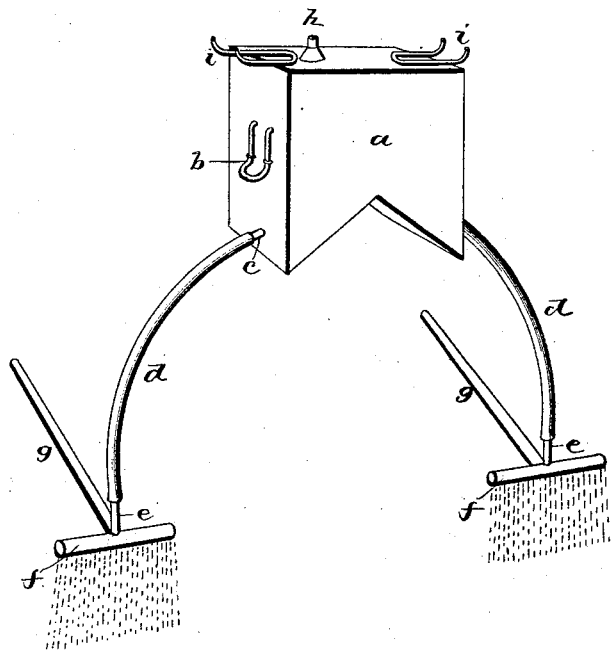
WITNESSES
INVENTORS

UNITED STATES PATENT OFFICE.

JOHN P. DUNCAN AND EDWARD D. PILLOW, OF HELENA, ARKANSAS.

POISON-DISTRIBUTER.

SPECIFICATION forming part of Letters Patent No. 321,011, dated June 30, 1885.

Application filed August 16, 1884. (No model.)

*To all whom it may concern:*

Be it known that we, JOHN P. DUNCAN and EDWARD D. PILLOW, of Helena, in the county of Phillips and State of Arkansas, have invented certain new and useful Improvements in Poison-Distributers; and we do hereby declare the following to be a full, clear, and exact description of the invention, such as will enable others skilled in the art to which it appertains to make and use the same.

Our invention relates to an improvement in poison-distributers, the object of the same being to provide a device which may be readily attached to the back of a horse in such manner as not to interfere with a rider, and by means of which the poisonous liquid can be distributed on each side of the horse over the plants. A further object is to provide a device which shall be simple and economical in construction, and durable and efficient in use; and with these ends in view our invention consists in the certain features of construction and combinations of parts, as will be fully described, and pointed out in the claims.

In the accompanying drawings, the figure shown is a perspective view of our improvement.

$a$ represents a suitable box or can made of galvanized iron, zinc, tin, or other desired material, and of any desired size. The bottom of the can is concaved, as shown, for the purpose of enabling it to be more readily adjusted to the back of a horse. The can is provided with the metallic loops $b$ on each of its sides, to which is secured the girt, and by means of which the can is secured in position. To the sides of the can, near the bottom, are secured in suitable holes, the pipes $c$, which are soldered therein, and to the outer ends of which are secured the rubber tubes $d$, which are in turn secured to the pipes $e$, which connect with the sprinklers $f$. These sprinklers are made as shown, and provided with handles $g$, located at right angles to the sprinkler, and at any convenient angle to the pipes $e$, by means of which the sprinklers are manipulated. The top of the can is provided with the opening $h$, by means of which the liquid is admitted, and the sides of the can, near the top, are provided with the ears or hooks $i$, upon which the handles $g$ are hung when it is desired to stop the flow of liquid.

When it is desired to use this apparatus, the same is secured to a horse in the manner above described. The operator then mounts the horse and takes hold of the handles, one in each hand, and, riding between the rows, he is thus enabled to sprinkle the contents of the can over the cotton, tobacco, or other plants to be treated.

It will be seen that owing to the concaved bottom the can will be effectively drained, and that as the can is elevated the liquid will have a tendency to flow freely.

Any well-known poisonous compounds can be used in connection with this device. We would have it understood that we do not limit ourselves to the exact construction shown and described, but hold ourselves at liberty to make such changes and alterations as properly fall within the spirit and scope of our invention.

Having fully described our invention, what we claim as new, and desire to secure by Letters Patent, is—

In a poison-distributer, the combination, with a tank the bottom of which is shaped to conform to the back of a horse, and provided with loops and hooks, of flexible tubes secured on opposite sides to the lower edge of the tank, the elongated sprinkler secured to the outer end of each flexible tube, and handles rigidly secured to and projecting rearwardly from the sprinklers, the said handles being sufficiently long to enable the sprinklers to be manipulated by a person riding behind the tank, substantially as set forth.

In testimony whereof we have signed this specification in the presence of two subscribing witnesses.

JOHN P. DUNCAN.
EDWARD D. PILLOW.

Witnesses:
R. C. MOORE,
THOS. H. RICE.